(12) United States Patent
Chen et al.

(10) Patent No.: US 11,733,212 B2
(45) Date of Patent: Aug. 22, 2023

(54) METHOD FOR QUANTITATIVE ANALYSIS OF CAVITY ZONE OF THE TOP OF CONCRETE-FILLED STEEL TUBE

(71) Applicant: GUANGXI UNIVERSITY, Guangxi (CN)

(72) Inventors: Zheng Chen, Guangxi (CN); Jielian Zheng, Guangxi (CN); Zengxin Ye, Guangxi (CN); Jiaping Liu, Guangxi (CN); Jianjun Wang, Guangxi (CN); Changjie Wu, Guangxi (CN); Wen Xu, Guangxi (CN); Weiwei Xie, Guangxi (CN)

(73) Assignee: Guangxi University, Nanning (CN)

( * ) Notice: Subject to any disclaimer, the term of this patent is extended or adjusted under 35 U.S.C. 154(b) by 197 days.

(21) Appl. No.: 17/212,955

(22) Filed: Mar. 25, 2021

(65) Prior Publication Data
US 2021/0310993 A1 Oct. 7, 2021

(30) Foreign Application Priority Data
Apr. 3, 2020 (CN) .......................... 202010261129.3

(51) Int. Cl.
*G01N 29/07* (2006.01)
*E04B 1/30* (2006.01)
*G01N 29/04* (2006.01)

(52) U.S. Cl.
CPC ............... *G01N 29/07* (2013.01); *E04B 1/30* (2013.01); *G01N 29/043* (2013.01); *G01N 2291/044* (2013.01); *G01N 2291/103* (2013.01)

(58) Field of Classification Search
CPC ................. G01N 29/07; G01N 29/043; G01N 2291/044; G01N 29/4472;
(Continued)

(56) References Cited

U.S. PATENT DOCUMENTS 6,047,602 A * 4/2000 Lynnworth ............. G01F 1/662
73/632
2016/0054266 A1 * 2/2016 Ozeki .................... G01N 29/07
73/598

(Continued)

FOREIGN PATENT DOCUMENTS

CN 106959341 A 7/2017
EP 2982971 B1 * 7/2017 ........... G01N 29/043
FR 2930345 A1 * 10/2009 ............. G01N 29/07

OTHER PUBLICATIONS

Xinwen Shi et al.; "Determination of the Cavity Degree of Concrete Filled Steel Tube by Ultrasonic Method"; Yellow River, vol. 32, No. 3; Mar. 2010; 3 pgs.; China Academic Journal Electronic Publishing House; http://www.cnki.net.

*Primary Examiner* — Francis C Gray
(74) *Attorney, Agent, or Firm* — Andrew D. Fortney; Central California IP Group, P.C.

(57) ABSTRACT

A method for quantitative analysis of a cavity at the top of a concrete-filled steel tube is disclosed. By substitution of the determined inner radius of the steel tube, the thickness of the steel tube wall and the propagation speed of ultrasonic waves in the steel tube and in the concrete, the propagation time of the ultrasonic wave between the top and the bottom of the concrete-filled steel tube enables calculation of the height of the cavity. The method can be used to quantify the cavity height at the top of the concrete-filled steel tube, with small relative errors and high accuracy.

20 Claims, 3 Drawing Sheets

(58) Field of Classification Search
CPC ..... G01N 2291/011; G01N 2291/0245; G01N 2291/048; E04B 2001/2478
See application file for complete search history.

(56) References Cited

U.S. PATENT DOCUMENTS

| | | | |
|---|---|---|---|
| 2019/0178765 A1* | 6/2019 | Saleem | G01N 29/07 |
| 2019/0195830 A1* | 6/2019 | Tamura | G01N 29/2437 |
| 2020/0064128 A1* | 2/2020 | Müggenburg | G01H 5/00 |

* cited by examiner

METHOD FOR QUANTITATIVE ANALYSIS OF CAVITY ZONE OF THE TOP OF CONCRETE-FILLED STEEL TUBE

FIELD OF THE INVENTION

The invention relates to the field of construction engineering detection and analysis, in particular to a method for quantitative analysis of the cavity zone of the top of the concrete-filled steel tube.

BACKGROUND OF THE INVENTION

Due to the unevenness of the concrete pouring and the volume shrinkage during the hardening process, concrete-filled steel tube arch bridges often have the phenomenon of cavity top concrete vacancy. The top vacancy of the concrete in the tube will directly affect the collaborative work between the steel tube and the concrete, or even in severe cases. It has an impact on the structural bearing capacity. How to accurately and quantitatively detect the void of the concrete top in the pipe and take measures to reinforce it has become the key to dealing with the void problem. The current methods for testing concrete voids in pipes are divided into destructive testing methods and non-destructive testing methods. The destructive testing method is to first determine the void location by percussion, and then drill holes or core-drill samples on the surface of the steel pipe to determine the void. However, this method can only be used for partial sampling, and it is difficult to reflect the compactness of the entire steel tube concrete. And it will bring permanent damage to the concrete-filled steel tube structure. The non-destructive testing methods currently used mainly include ultrasonic testing, infrared thermal imaging, piezoelectric ceramics, etc. Among the many non-destructive testing technologies, ultrasonic testing technology has become a reality due to its convenient operation, low cost, and ease of use on site. The preferred method for void detection of concrete-filled steel tube. However, when ultrasonic testing is applied to concrete-filled steel tube structures, it can only qualitatively determine the location of the void area and the relative void degree, but cannot quantitatively determine the void area characteristic values such as void height, void arc length, and void chord length. A quantitative analysis method for the void area at the top of concrete-filled steel tube is proposed to quantitatively evaluate the compactness of concrete-filled steel tube.

At present, the published quantitative methods for analyzing the cavity situation by ultrasonic wave method include Document 1 and Document 2, both providing methods to quantitatively calculate the cavity height of concrete, but the ultrasonic propagation paths adopted in Document 1 and Document 2 are both simplified to a greater extent than the real path, and the accuracies are low. Therefore, the cavity height calculated by the proposed calculation methods of the cavity height of concrete has a relatively large relative error, with low accuracy.

Publications of the Prior Art:

Document 1: Patent: CN106959341A

Document 2: Journal article, "Determination of the Cavity Degree of Concrete Filled Steel Tube by Ultrasonic Method" (SHI Xinwen, WEI Jiandong, Yellow River, Vol. 32, No. 3, March 2010).

SUMMARY OF THE INVENTION

The invention aims to provide a quantitative analysis method of the cavity zone of the top of the concrete-filled steel tube, in view of the existing technical problems of large relative errors, low accuracy of the quantity of the cavity zone in the prior art when the ultrasonic detection method applied to the concrete-filled steel tube structure. This method can quantify the characteristic values of the top of the concrete-filled steel tube such as cavity height, cavity arc length and cavity chord length, and cavity area, with small relative errors and high accuracy.

In order to realize the above aims, the technical solutions adopted by the present invention are as follows:

A method for quantitative analysis of cavity zone of the top of the concrete-filled steel tube, comprising the following steps:

Step 1: Determine the inner radius of the steel tube, the thickness of the tube wall; determine the propagation speed of the ultrasonic wave in the steel tube and the concrete; determine the starting time of the first wave when the ultrasonic wave propagating between the top and bottom of the concrete-filled steel tube;

Step 2: By substitution of the determined inner radius of the steel tube, the thickness of the tube wall and the propagation speed of the ultrasonic wave in the steel tube, the propagation speed of the ultrasonic wave in of the ultrasonic wave in the concrete, and the starting time of the first wave when the ultrasonic wave propagating between the top and the bottom of the concrete-filled steel tube obtained in Step 1 into the calculation model of the cavity height of the top of the concrete-filled steel tube, to obtain the cavity height of the top of the concrete-filled steel tube; the calculation model of the cavity height is:

$$t = \left( \frac{x_1 + \sqrt{d^2 + 2x_2(d+r)}}{v_s} + \frac{\sqrt{4r^2 + d^2 + 4rd - 2rh - 2hd} - \sqrt{d^2 + 2x_2(d+r)}}{v_c} \right);$$

Wherein, t is the starting time of the first wave, with the unit as seconds (s); r is the inner radius of the steel tube, with the unit as meters (m); d is the thickness of the steel tube wall, with the unit as meters (m); h is the cavity height of the top of the concrete-filled steel tube, with the unit as meters (m); $v_s$ and $v_c$ are respectively the propagation speeds of the ultrasonic wave in the steel tube and that in the concrete, with the unit as m/s; $x_1$ and $x_2$ are both calculation variables, and their values are:

$$x_1 = \frac{d^2 + 2hd + 2rh}{h+d} \cdot \arcsin\left(\frac{h+d}{\sqrt{d^2 + 2hd + 2rh}}\right)$$

$$x_2 = \frac{x_3 + \sqrt{x_3^2 - (-4r^2 - d^2 + 2rh - 4rd + hd)(h^2 - 2rh)d^2}}{-4r^2 - d^2 + 2rh - 4rd + hd}$$

Wherein, $x_3 = -4r^3 - rh^2 - rd^2 + 4hr^2 - 4dr^2 + 4drh - dh^2$.

The present invention provides a method for quantitively analysis of the cavity zone of the top of the concrete-filled steel tube, by analyzing the propagation process of the ultrasonic wave in the concrete-filled steel tube, the method reveals the propagation path of the ultrasonic wave in the cavity of the top of the concrete-filled steel tube. According to this propagation path, a calculation model of the cavity height based on the top of the concrete-filled steel tube is established. The cavity height calculation model can be used to quantify the cavity height, so as to accurately evaluate the pouring density of the concrete in the pipe, with small relative errors and high accuracy.

Further, in Step 1, ultrasonic detectors are used to measure the propagation speed of the ultrasonic wave in the steel pipe and the propagation speed of the ultrasonic wave in the concrete.

Further, when measuring the propagation speed of ultrasonic waves in the steel pipe, the sensors are in good contact with the steel pipe through the ultrasonic couplant, and the sensors are placed on opposite sides of the outer wall of the steel pipe. N times measurements are performed, and the average value is taken as the ultrasonic propagation speed $v_s$ in the steel pipe, wherein n≥3.

Further, in Step 1, the method for measuring (determining) the starting time of the first wave when the ultrasonic wave propagating between the top and the bottom of the concrete-filled steel tube is: install ultrasonic sensors respectively on the two opposite sides of the outer wall of the concrete-filled steel tube, use ultrasonic detectors to measure the shortest propagation time between the sensors at the top and the sensors at the bottom of the concrete-filled steel tube, that is, the starting time of the first wave.

Further, Step 2 is calculated via an iterative method.

Further, by substitution of the cavity height of the top of the concrete-filled steel tube obtained in Step 2 into the cavity arc length calculation model to obtain the cavity arc length, and the cavity arc length calculation model is $$\alpha = 4r \cdot \arcsin\left(\frac{\sqrt{2rh}}{2r}\right),$$

wherein, α is the cavity arc length, with the unit as meters (m); l is the cavity chord length, with the unit as meters (m).

Further, by substitution of the cavity height of the top of the concrete-filled steel tube obtained in Step 2 into the cavity chord length calculation model to obtain the cavity chord length, and the cavity chord length calculation model is $l=2\sqrt{2hr-h^2}$, wherein α is the cavity arc length, with the unit as meters (m); l is the cavity chord length, with the unit as meters (m).

Further, by substitution of the cavity height of the top of the concrete-filled steel tube obtained in Step 2 into the cavity area calculation model to obtain the cavity area, and the cavity area calculation model is $$S = r^2 \cdot \arcsin\left(\frac{\sqrt{2rh-h^2}}{r}\right) - (r-h)\sqrt{2rh-h^2}$$

Wherein S is the cavity area, with the unit as square meters (m²).

Further, the calculation models of the cavity height, the cavity arc length, the cavity chord length, and the cavity area are all calculated in the radian measure.

Further, the calculation model of the cavity height is used to calculate cavity components of concrete-filled steel tube with the cavity height range of 2 (mm)~0.5 r, wherein r is the inner radius of Steel Tube 9 with the unit as m.

In summary, due to the adoption of the above technical solutions, the beneficial effects of the present invention are:

1. The present invention provides a quantitative analysis method for the cavity area of the top of the concrete-filled steel tube. By analyzing the propagation process of ultrasonic waves in the concrete-filled steel tube, the method reveals the propagation path of ultrasonic waves in the concrete-filled steel tube with cavities on the top, and on the basis of this path, a cavity height calculation model is established based on the cavity height of the top of the concrete-filled steel tube, this cavity height calculation model can be used to quantify the cavity height so as to accurately evaluate the pouring density of the concrete in the tube. The relative error is within 5.0% and the accuracy is high.

2. The present invention also provides calculation models of the cavity arc length, the cavity chord length and the cavity area. By substituting the cavity height calculated by the cavity height calculation model provided by the present invention into calculation models of the cavity arc length, the cavity chord length and the cavity area, the relative errors between the measured characteristic value of the void area and the actual measured value are small, as to be 7.0% or less.

Reference numbers: 7—cavity zone; 8—concrete; 9—steel tube; 10—sensors.

DETAILED DESCRIPTION OF THE INVENTION

The invention is described in detail in combination with the attached drawings below.

In order to make the purpose, technical solutions and advantages of the present invention to be clear, the present invention is further described in detail in combination with the attached drawings and embodiments below. It is understood that the specific embodiments described herein only aims to explain the invention but not to limit it.

Example 1

This example is a specific embodiment of the quantitative analysis method for the Cavity Zone 7 of the top of the concrete-filled steel tube, comprising the following steps:

(1) Determine the Basic Parameters of the Cross Section of Steel Tube 9:

The inner radius r and the tube wall thickness d of Steel Tube 9 are determined by measurement. The measured results are r=0.069 m, d=0.006 m.

Figure 1:
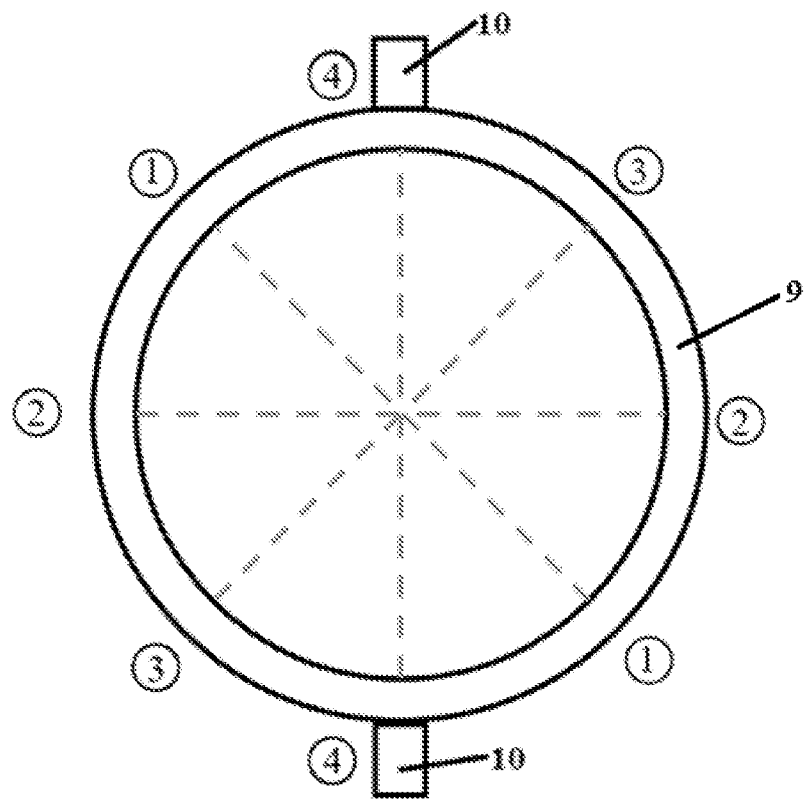
FIG. 1 is a distribution diagram of the measuring points for measuring the propagation speed of ultrasonic waves in the steel tube.
Figure 2:
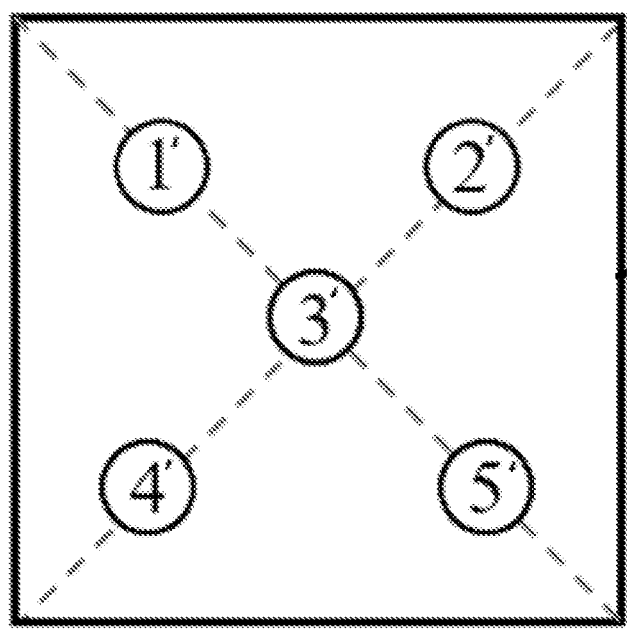
FIG. 2 is a distribution diagram of the measuring points for measuring the propagation speed of ultrasonic waves in the concrete.
Figure 3:
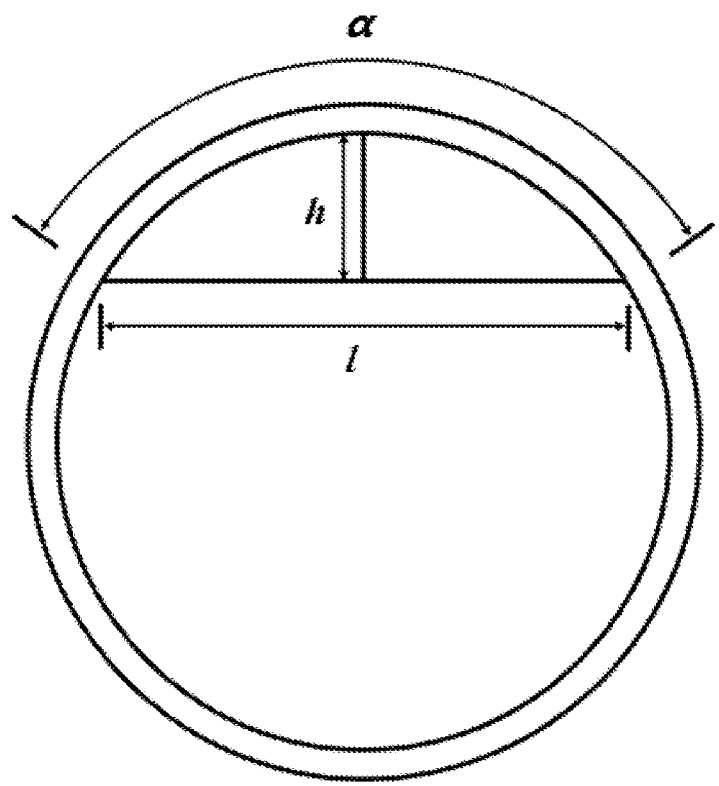
FIG. 3 is a schematic diagram of the correlations between the cavity height, the cavity arc length and the cavity chord length.

(2) Determine the Propagation Speeds of the Ultrasonic Wave in Steel Tube 9 and in Concrete 8:

The propagation speed $v_s$ of the ultrasonic wave in Steel Tube 9 and the propagation speed $v_c$ of the ultrasonic wave in Concrete 8 are measured by the ultrasonic detectors respectively. When measuring the propagation speed of the ultrasonic wave in Steel Tube 9, Sensors 10 are in good contact with Steel Tube 9 through an ultrasonic couplant. Sensors 10 are placed on the two opposite sides of the outer wall of Steel Pipe 9 and 4 times of measurements are performed, and the average value is taken as the propagation speed $v_s$ of Steel Pipe 9, the distribution of measuring points ①, ②, ③, ④ are shown in FIG. 1. When measuring the propagation speed of the ultrasonic wave in Concrete, the Sensors are in good contact with the test specimen of Concrete through the ultrasonic couplant. The test specimen of Concrete shown in FIG. 2 is a cube specimen of 150 mm×150 mm×150 mm. Choose five measuring points on the surface, and the average value of the measured values is the propagation speed $v_c$ of the ultrasonic wave in Concrete. The distribution of the measuring points ①,②,③,④,⑤ is shown in FIG. 2. The measured results are: $v_s$=5702 m/s; $v_c$=3843 m/s.

(2) Establish the Calculation Model of the Starting Time of the First Wave Based on the Cavity Height of the Top of the Concrete-Filled Steel Tube:

According to the inner radius of Steel Tube 9 and the tube wall thickness determined in Step (1) and the propagation speeds of the ultrasonic wave in Steel Tube 9 and in Concrete 8 determined in Step (2), a correlation model of the starting time of the first wave and the cavity height of the top of the concrete-filled steel tube is established as:

$$t = \left( \frac{x_1 + \sqrt{0.006^2 + 0.15x_2}}{5702} + \frac{\sqrt{0.020736 - 0.15h} - \sqrt{0.006^2 + 0.15x_2}}{3843} \right)$$

Wherein t is the starting time of the first wave, with the unit as seconds (s), h is the cavity height of the top of the concrete-filled steel tube, with the unit as meters (m); $x_1$ and $x_2$ are both calculation variables, and their values are:

$$x_1 = \frac{0.000036 + 0.15h}{h + 0.006} \cdot \arcsin\left( \frac{h + 0.006}{\sqrt{0.000036 + 0.15h}} \right)$$

$$x_2 = \frac{x_3 + \sqrt{x_3^2 - 0.000036(-0.020736 + 0.144h)(h^2 - 0.138h)}}{-0.020736 + 0.144h}$$

Wherein $x_3 = -0.001430784 - 0.075h^2 + 0.0207h$.

(4) Determine the Starting Time of the First Wave when the Ultrasonic Wave Propagating Between the Top and the Bottom of the Concrete-Filled Steel Tube:

Install ultrasonic wave Sensors 10 on the top and the bottom of the concrete-filled steel tube, and use ultrasonic detectors to measure the shortest time that the ultrasonic wave propagates between Sensor 10 at the top and Sensor 10 at the bottom of the concrete-filled steel tube, that is, the starting time of the first wave t, and the measured results of three specimen groups are respectively: $4.27 \times 10^{-5}$ s, $4.41 \times 10^{-5}$ s, $4.51 \times 10^{-5}$ s;

(5) Calculate the Cavity Height of the Top of the Concrete-Filled Steel Tube:

According to the calculation model of the starting time of the first wave based on the cavity height of the top of the concrete-filled steel tube established in Step (3), use the starting time of the first wave determined in Step (4), the cavity height of the top of the concrete-filled steel tube is calculated by iterative analysis, the cavity heights are: 0.0104 m, 0.0191 m, 0.0311 m, respectively.

(6) Calculate the Cavity Arc Length, the Cavity Chord Length and the Cavity Area of the Concrete-Filled Steel Tube:

According to the cavity height of the top of the concrete-filled steel tube calculated in Step (5), and the calculation model of the cavity arc length, the cavity chord length and the cavity area, calculate the cavity arc length, the cavity chord length and the cavity area of the top of the concrete-filled steel tube, taking h=0.0104 m as an example:

$$a = 0.276 \cdot \arcsin\left( \frac{\sqrt{0.0014352}}{0.138} \right) = 0.0768 (m)$$

$$l = 2\sqrt{0.0014352 - 0.00010816} = 0.0729 (m)$$

$$S = 0.004761 \cdot \arcsin\left( \frac{\sqrt{0.00132704}}{0.069} \right) - 0.0586 \cdot \sqrt{0.00132704} = 0.0005133 m^2.$$

Wherein α is the cavity arc length, with the unit as meters (m), l is the cavity chord length, with the unit as meters (m): S is the cavity area, with the unit as square meters ($m^2$).

The calculation results of three groups are listed in Table 1. While, the testing Steel Pipe 9 is split and the actual measurement results obtained by measuring the cross section of the concrete-filled steel tube are also listed in Table 1.

TABLE 1

Comparison of calculated values and measured values of the cavity arc length and the cavity chord length

| Group | | Measured value | By the models of the present invention | | By the models of Document 1 & Document 2 | |
|---|---|---|---|---|---|---|
| | | | Calculated value | Relative error | Calculated value | Relative error |
| 1 | Cavity height/m | 0.0100 | 0.0104 | 4.0% | 0.0075 | 25% |
| | Cavity arc length/m | 0.0752 | 0.0768 | 2.1% | 0.0653 | 15% |
| | Cavity chord length/m | 0.0716 | 0.0729 | 1.8% | 0.0629 | 12% |
| | Cavity area/$m^2$ | 0.0004815 | 0.0005133 | 6.6% | 0.0003164 | 34% |
| 2 | Cavity height/m | 0.0200 | 0.0191 | 4.5% | 0.0148 | 26% |
| | Cavity arc length/m | 0.1080 | 0.1052 | 2.6% | 0.0921 | 15% |

TABLE 1-continued

Comparison of calculated values and measured values
of the cavity arc length and the cavity chord length

| Group | Measured value | By the models of the present invention | | By the models of Document 1 & Document 2 | |
|---|---|---|---|---|---|
| | | Calculated value | Relative error | Calculated value | Relative error |
| | Cavity chord length/m | 0.0970 | 0.0953 | 1.8% | 0.0854 | 12% |
| | Cavity area/m² | 0.001338 | 0.001252 | 6.4% | 0.0008625 | 36% |
| 3 | Cavity height/m | 0.0300 | 0.0311 | 3.6% | 0.0238 | 21% |
| | Cavity arc length/m | 0.1339 | 0.1365 | 1.9% | 0.1182 | 12% |
| | Cavity chord length/m | 0.1138 | 0.1153 | 1.3% | 0.1043 | 8.3% |
| | Cavity area/m² | 0.002399 | 0.002525 | 5.2% | 0.001721 | 28% |

Through comparison, it is found that the relative errors between the calculated values and the actual measured values of the characteristic values of Cavity Zone 7 of the top of the concrete-filled steel tube analyzed based on the method of the present invention are all less than 7.0%, indicating that the method of the present invention is better than the existing model, and thus verifies the effectiveness and accuracy of the present invention.

Example 2

This example is a specific embodiment of the quantitative analysis method of the top of Cavity Zone 7 of concrete-filled steel tube, comprising the following steps:

(1) Determine the Basic Parameters of the Cross Section of Steel Tube 9:

The inner radius r and the tube wall thickness d of Steel Tube 9 are determined by measurement. The measured results are r=0.638 m, d=0.022 m.

(2) Determine the Propagation Speeds of the Ultrasonic Wave in Steel Tube 9 and in Concrete 8:

The propagation speed $v_s$ of the ultrasonic wave in Steel Tube 9 and the propagation speed $v_c$ of the ultrasonic wave in Concrete 8 are measured by the ultrasonic detectors respectively. When measuring the propagation speed of the ultrasonic wave in Steel Tube 9, Sensors 10 are in good contact with Steel Tube 9 through the ultrasonic couplant. Sensors 10 are placed on the two opposite sides of the outer wall of Steel Pipe 9 and 4 times of measurements are performed, and the average value is taken as the propagation speed $v_s$ of Steel Pipe 9, the distribution of measuring points ①, ②, ③, ④ is shown in FIG. 1. When measuring the propagation speed of the ultrasonic wave in Concrete, the Sensors are in good contact with the test specimen of Concrete through the ultrasonic couplant. The test specimen of Concrete shown in FIG. 2 is a cube specimen of 150 mm×150 mm×150 mm. Choose five measuring points on the surface, and the average value of the measured values is the propagation speed $v_c$ of the ultrasonic wave in Concrete. The distribution of the measuring points ①, ②, ③, ④, ⑤ is shown in FIG. 2. The measured results are: $v_s$=5702 m/s; $v_c$=3843 m/s.

(3) Establish the Calculation Model of the Starting Time of the First Wave Based on the Cavity Height of the Top of the Concrete-Filled Steel Tube:

According to the inner radius of Steel Tube 9 and the tube wall thickness determined in Step (1) and the propagation speeds of the ultrasonic wave in Steel Tube 9 and in Concrete 8 determined in Step (2), a correlation model of the starting time of the first wave and the cavity height of the top of the concrete-filled steel tube is established as:

$$t = \left( \frac{x_1 + \sqrt{0.022^2 + 1.32 x_2}}{5735} + \frac{\sqrt{1.6848 - 1.32h} - \sqrt{0.022^2 + 1.32 x_2}}{3895} \right)$$

Wherein t is the starting time of the first wave, with the unit as seconds (s), h is the cavity height of the top of the concrete-filled steel tube, with the unit as meters (m); $x_1$ and $x_2$ are both calculation variables, and their values are:

$$x_1 = \frac{0.000484 + 1.32h}{h + 0.022} \cdot \arcsin\left( \frac{h + 0.022}{\sqrt{0.000484 + 1.32h}} \right)$$

$$x_2 = \frac{x_3 + \sqrt{x_3^2 - 0.000484(-1.6848 + 1.298h)(h^2 - 1.276h)}}{-1.6848 + 1.298h}$$

Wherein $x_3 = -1.074905 - 0.66h^2 + 1.68432h$.

(4) Determine the Starting Time of the First Wave when the Ultrasonic Wave Propagating Between the Top and the Bottom of the Concrete-Filled Steel Tube:

Install ultrasonic wave Sensors 10 on the top and the bottom of the concrete-filled steel tube, and use ultrasonic detectors to measure the shortest time that the ultrasonic wave propagates between Sensor 10 at the top and Sensor 10 at the bottom of the concrete-filled steel tube, that is, the starting time of the first wave t, and the measured results of three specimen groups are respectively: 3.608×10⁻⁴ s, 3.649×10⁻⁴ s, 3.711×10⁻⁴ s;

(5) Calculate the Cavity Height of the Top of the Concrete-Filled Steel Tube:

According to the calculation model of the starting time of the first wave based on the cavity height of the top of the concrete-filled steel tube established in Step (3), use the starting time of the first wave determined in Step (4), the cavity height of the top of the concrete-filled steel tube is calculated by iterative analysis, the cavity heights are: 0.0258 m, 0.0349 m, 0.0523 m, respectively.

(6) Calculate the Cavity Arc Length and the Cavity Chord Length of the Concrete-Filled Steel Tube:

According to the cavity height of the top of the concrete-filled steel tube calculated in Step (5), and the calculation model of the cavity arc length, the cavity chord length and the cavity area, calculate the cavity arc length, the cavity chord length and the cavity area of the top of the concrete-filled steel tube, taking h=0.0523 m as an example:

$$a = 2.552 \cdot \arcsin\left(\frac{\sqrt{0.0667348}}{1.276}\right) = 0.5203 \text{(m)}$$

$$l = 2\sqrt{0.0667348 - 0.00273529} = 0.5060 \text{(m)}$$

$$S = 0.407044 \cdot \arcsin\left(\frac{\sqrt{0.0634}}{0.638}\right) - 0.5854 \cdot \sqrt{0.0634} = 0.01779 \text{m}^2$$

Wherein α is the cavity arc length, with the unit as meters (m), l is the cavity chord length, with the unit as meters (m): S is the cavity area, with the unit as square meters (m²).

The calculation results of three groups are listed in Table 2. While, the testing Steel Pipe 9 is drilled and the actual measurement results obtained by measuring the cross section of the concrete-filled steel tube are also listed in Table 2.

TABLE 2

Comparison of calculated values and measured values of the cavity arc length and the cavity chord length

| Group | Measured value | By the models of the present invention | | By the models of Document 1 & Document 2 | |
|---|---|---|---|---|---|
| | | Calculated value | Relative error | Calculated value | Relative error |
| 1 | Cavity height/m | 0.0270 | 0.0258 | 4.4% | 0.0203 | 25% |
| | Cavity arc length/m | 0.3725 | 0.3641 | 2.3% | 0.3228 | 13% |
| | Cavity chord length/m | 0.3673 | 0.3592 | 2.2% | 0.3194 | 13% |
| | Cavity area/m² | 0.006640 | 0.006204 | 6.5% | 0.004335 | 35% |
| 2 | Cavity height/m | 0.0360 | 0.0349 | 3.1% | 0.0284 | 21% |
| | Cavity arc length/m | 0.4307 | 0.4240 | 1.6% | 0.3818 | 11% |
| | Cavity chord length/m | 0.4226 | 0.4162 | 1.5% | 0.3761 | 11% |
| | Cavity area/m² | 0.01020 | 0.009734 | 4.6% | 0.007160 | 30% |
| 3 | Cavity height/m | 0.0510 | 0.0523 | 2.6% | 0.0439 | 14% |
| | Cavity arc length/m | 0.5137 | 0.5203 | 1.3% | 0.4762 | 7.3% |
| | Cavity chord length/m | 0.4999 | 0.5060 | 1.2% | 0.4652 | 6.9% |
| | Cavity area/m² | 0.01700 | 0.01779 | 4.6% | 0.01371 | 19% |

Through comparison, it is found that the relative errors between the calculated values and the actual measured values of the characteristic values of Cavity Zone 7 of the top of the concrete-filled steel tube analyzed based on the method of the present invention are all less than 7.0%, indicating that the method of the present invention is better than the existing model, and thus verifies the effectiveness and accuracy of the present invention.

Example 3

Figure 4:
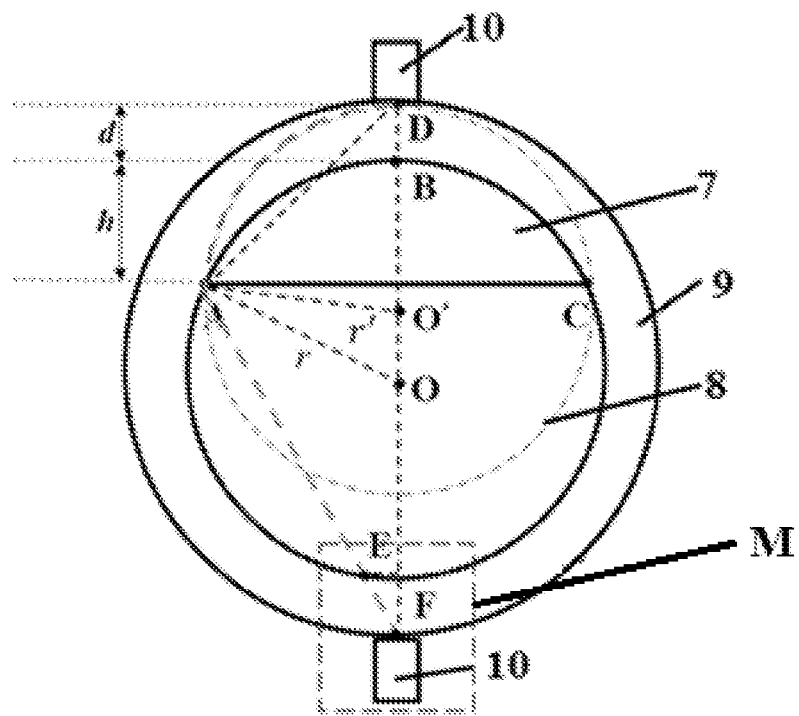
FIG. 4 is a schematic diagram of the propagation path of the ultrasonic wave and the relevant parameters of the calculation model.
Figure 5:
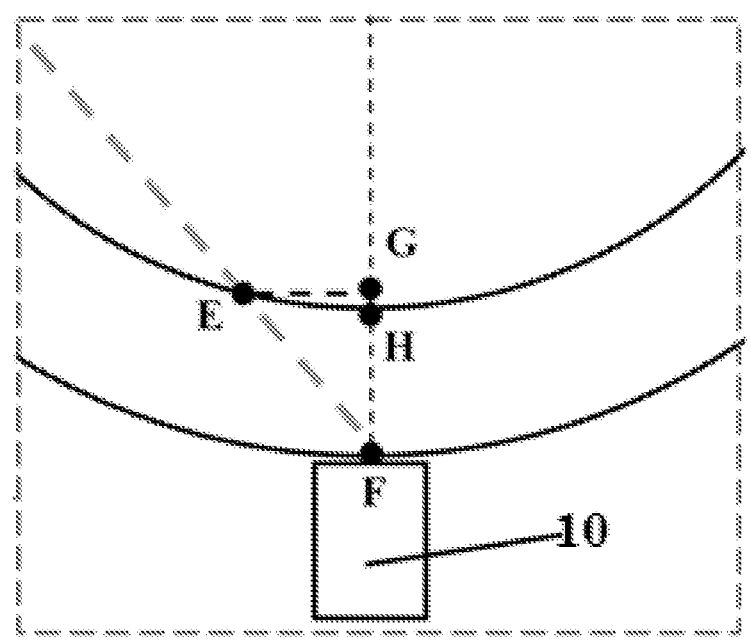
FIG. 5 is an enlarged schematic diagram of the M block zone in FIG. 4.

This example will describe the establishing process of the simplified calculation model in detail with reference to FIGS. 4 and 5.

As shown in FIG. 4, the propagation path of the ultrasonic wave in the concrete-filled steel tube in the cavity condition in the present invention is from Point D→A→E→F, wherein the paths through Steel Pipe 9 include D→A and E→F, the path through Concrete 8 is A→E.

The path D→A is regarded as a circular arc in the present invention, which is recorded as the calculation variable $x_1$. In order to find $x_1$, the radius r' and the chord length $L_{DA}$ of this arc need to be known, wherein:

The radius of the arc of the path $$r' = \frac{d^2 + 2hr + 2dh}{2(h+d)}$$

The chord length $$L_{DA} = \sqrt{d^2 + 2hr + 2dh}$$

Then calculate the variable $$x_1 = 2r' \cdot \arcsin\left(\frac{L_{DA}}{2r'}\right) = \frac{a^2 + 2hr + 2dh}{h+a} \cdot \arcsin\left(\frac{h+a}{\sqrt{a^2 + 2hr + 2dh}}\right).$$

Where r is the inner radius of Steel Tube 9 with the unit as meters (m); d is the thickness of the tube wall with the unit as meters (m); h is the cavity height of the top of the concrete-filled steel tube with the unit as meters (m);

The path A→E→F is regarded as a straight line segment in the present invention. To find the lengths of the path A→E and E→F, it is necessary to cross Point E as the perpendicular line of OF and intersect at Point G, and record the length of GH as the calculation variable $x_2$, as shown in FIG. 5.

To find the length of $x_2$, it needs to establish two equations simultaneously:

From the relationship of the circle, we can obtain:

$$L_{EG}^2 + (r-x_2)^2 = r^2;$$

From the relationship of similar triangles, we can obtain:

$$\frac{\sqrt{r^2-(r-h)^2}}{L_{EG}} = \frac{2r-h+d}{x_2+d}$$

Solve simultaneously to obtain:

$$x_2 = \frac{x_3 + \sqrt{x_3^2 - (-4r^2 - d^2 + 2rh - 4rd + hd)(h^2 - 2rh)d^2}}{-4r^2 - d^2 + 2rh - 4rd + hd}$$

Wherein $x_3 = -4r^3 - rh^2 - rd^2 + 4hr^2 - 4dr^2 + 4drh - dh^2$.

So it can be obtained that the length of AF is:

$$L_{AF} = \sqrt{4r^2+d^2+4dr-2rh-2hd};$$

And the length of EF is:

$$L_{EF} = \sqrt{d^2+2x_2(d+r)}.$$

The propagation time of the ultrasonic wave in the concrete-filled steel tube should be composed of two parts, namely the propagation time in the steel tube and the propagation time in the concrete. Combined with the path length calculation model, the calculation model of the starting time of the first wave based on the cavity height of the top of the concrete-filled steel tube of the present invention can be obtained, namely the exact model:

$$t = \left(\frac{x_1 + \sqrt{d^2 + 2x_2(d+r)}}{v_s} + \frac{\sqrt{4r^2 + d^2 + 4rd - 2rh - 2hd} - \sqrt{d^2 + 2x_2(d+r)}}{v_c}\right)$$

The descriptions of the patents, patent applications and publications cited in the present invention are all incorporated into the present invention by reference. Any references cited should not be considered as allowing these references to be used as "prior art" in the present invention.

The above descriptions are only the preferred embodiments of the present invention and are not intended to limit the present invention. Any modification, equivalent replacement and improvement made within the spirit and principle of the present invention shall be included within the protection scope of the present invention.

What is claimed is:

1. A method for quantitatively determining a height of a cavity in a steel tube containing concrete, comprising:
   determining an inner radius of the steel tube, the steel tube having a wall;
   determining a thickness of the wall of the steel tube;
   determining a propagation speed of an ultrasonic wave in each of (i) the steel tube and (ii) the concrete;
   using ultrasonic sensors on an outer surface of the wall of the steel tube containing the concrete, at a top of the steel tube and at a bottom of the steel tube, determining a propagation time of the ultrasonic wave propagating between the top and the bottom of the steel tube containing the concrete; and calculating the height of the cavity according to:

$$t = \left(\frac{x_1 + \sqrt{d^2 + 2x_2(d+r)}}{v_s} + \frac{\sqrt{4r^2 + d^2 + 4rd - 2rh - 2hd} - \sqrt{d^2 + 2x_2(d+r)}}{v_c}\right)$$

wherein t is the propagation time of the ultrasonic wave in seconds; r is the inner radius of the steel tube in meters; d is the thickness of the wall of the steel tube in meters; h is the height of the cavity in the steel tube in meters; $v_s$ and $v_c$ are the propagation speeds of the ultrasonic wave in the steel tube and in the concrete, respectively, in m/s; and $x_1$ and $x_2$ are both calculation variables having values dependent on h.

2. The method of claim 1, further comprising calculating an arc length of the cavity according to $$\alpha = 4r \cdot \arcsin\left(\frac{\sqrt{2rh}}{2r}\right),$$

wherein α is the arc length in meters.

3. The method of claim 1, further comprising calculating a chord length of the cavity according to $l = \sqrt{2hr - h^2}$, wherein l is the chord length in meters.

4. The method of claim 1, further comprising calculating an area of the cavity according to:

$$S = r^2 \cdot \arcsin\left(\frac{\sqrt{2rh-h^2}}{r}\right) - (r-h)\sqrt{2rh-h^2}$$

wherein S is the area of the cavity in square meters.

5. The method of claim 2, further comprising calculating a chord length of the cavity according to $l = 2\sqrt{2hr - h^2}$, wherein l is the chord length in meters.

6. The method of claim 2, further comprising calculating an area of the cavity according to:

$$S = r^2 \cdot \arcsin\left(\frac{\sqrt{2rh-h^2}}{r}\right) - (r-h)\sqrt{2rh-h^2}$$

wherein S is the area of the cavity in square meters.

7. The method of claim 3, further comprising calculating an area of the cavity according to:

$$S = r^2 \cdot \arcsin\left(\frac{\sqrt{2rh-h^2}}{r}\right) - (r-h)\sqrt{2rh-h^2}$$

wherein S is the area of the cavity in square meters.

8. The method of claim 1, wherein the height of the cavity is calculated iteratively.

9. The method of claim 1, further comprising contacting each of the ultrasonic sensors with the steel pipe through an ultrasonic couplant.

10. The method of claim 1, further comprising placing the ultrasonic sensors on opposite sides of the outer wall of the steel pipe.

11. The method of claim 1, comprising determining the propagation speed of the ultrasonic wave in each of (i) the steel tube and (ii) the concrete N times, wherein N≥3.

12. The method of claim 11, further comprising calculating an average value of the N propagation speeds, wherein the average value of the propagation speed of the ultrasonic wave in the steel tube is the propagation speed $v_s$ in the steel tube.

13. The method of claim 11, wherein the propagation speed of the ultrasonic wave in the steel tube is determined at 4 points, and the propagation speed of the ultrasonic wave in the concrete is determined at 5 points.

14. The method of claim 13, further comprising calculating an average value of the propagation speed of the ultrasonic wave in the steel tube at the 4 points, and calculating an average value of the propagation speed of the ultrasonic wave in the concrete at the 5 points.

15. The method of claim 14, wherein the average value of the propagation speed of the ultrasonic wave in the steel tube at the 4 points is the propagation speed $v_s$ in the steel tube, and the average value of the propagation speed in the concrete at the 5 points is the propagation speed $v_c$ in the concrete.

16. The method of claim 1, wherein the height of the cavity is calculated in a radian measure.

17. The method of claim 1, further comprising evaluating a pouring density of the concrete in the steel tube.

18. The method of claim 1, wherein determining the inner radius of the steel tube comprises measuring the inner radius of the steel tube.

19. The method of claim 1, wherein determining the thickness of the wall of the steel tube comprises measuring the thickness of the wall of the steel tube.

20. The method of claim 1, wherein $x_1$ and $x_2$ are:

$$x_1 = \frac{0.000484 + 1.32h}{h + 0.022} \cdot \arcsin\left(\frac{h + 0.022}{\sqrt{0.000484 + 1.32h}}\right)$$

$$x_2 = \frac{x_3 + \sqrt{x_3^2 - 0.000484(-1.6848 + 1.298h)(h^2 - 1.276h)}}{-1.6848 + 1.298h}$$

and $x_3 = -1.074905 - 0.66h^2 + 1.68432h$.

* * * * *